Figure 1:
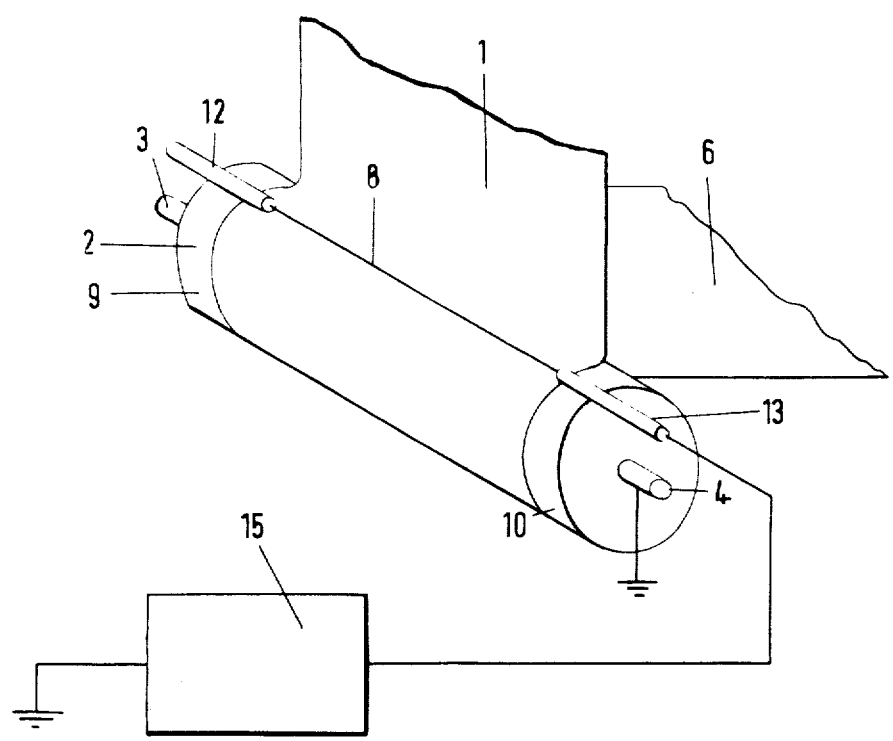

United States Patent [19]
Groves et al.

[11] 4,046,842
[45] Sept. 6, 1977

[54] CASTING OF POLYMERIC FILM

[75] Inventors: David John Groves, Hitchin; Albert Mason, Stevenage, both of England

[73] Assignee: Imperial Chemical Industries Limited, London, England

[21] Appl. No.: 599,935

[22] Filed: July 28, 1975

Related U.S. Application Data

[63] Continuation-in-part of Ser. No. 440,571, Feb. 7, 1974, abandoned, and a continuation-in-part of Ser. No. 336,047, Feb. 26, 1973, abandoned.

[30] Foreign Application Priority Data

Feb. 7, 1973 United Kingdom ............... 6031/73
Aug. 5, 1974 United Kingdom ............. 34337/74

[51] Int. Cl.$^2$ .................... B29D 7/22; H05B 7/00
[52] U.S. Cl. ........................... 264/22; 226/94; 264/216; 271/275; 271/DIG. 3; 425/174.8 E; 361/211; 361/213; 361/115

[58] Field of Search .................. 264/22, 216; 425/174.8 E; 226/94; 317/262 E; 271/275, DIG. 3

[56] References Cited

U.S. PATENT DOCUMENTS

| | | | |
|---|---|---|---|
| 3,196,063 | 7/1965 | Paquin et al. | 264/22 |
| 3,223,757 | 12/1965 | Owens et al. | 264/22 |
| 3,391,044 | 7/1968 | Kaghan et al. | 264/22 |
| 3,520,959 | 7/1970 | Busby | 264/22 |
| 3,709,964 | 1/1973 | De Geest et al. | 264/22 |
| 3,717,801 | 2/1973 | Silverberg | 317/262 E |
| Re. 27,771 | 10/1973 | Owens et al. | 264/22 |

OTHER PUBLICATIONS

"Corona Discharge", McGraw-Hill Encyclopedia, 3, pp. 541-542, 1971.

*Primary Examiner*—Jeffery R. Thurlow
*Attorney, Agent, or Firm*—Cushman, Darby & Cushman

[57] ABSTRACT

AC electrostatic-pinning for the casting and quenching of polymeric film, especially polyethylene terephthalate film.

11 Claims, 5 Drawing Figures

CASTING OF POLYMERIC FILM

This application is a continuation-in-part application of Ser. No. 336,047 filed 26 Feb., 1973 and of Ser. No. 440,571 filed 7 Feb. 1974 (both now abandoned).

The present invention relates to the production of films from organic thermoplastic polymeric materials and in particular to a process and apparatus for electrostatically pinning a film to a casting surface.

Polymeric film may be made by extrusion from a slot die on to a casting surface, such as a rotating drum or moving belt, which may be cooled so as to quench the molten film into a solidified form suitable for subsequent film making operations. In the case of certain crystallisable polymeric materials, such as polyethylene terephthalate, it is important to rapidly quench the extruded film to a temperature below its second order glass transition temperature to minimise the onset of excessive crystallinity in the film which would cause embrittlement and interfere with subsequent film making operations. A known method of quenching molten film involves a technique commonly known as electrostatic-pinning in which electrostatic charges are deposited upon the molten film as it reaches the casting surface so that the film is electrostatically attracted to the casting surface, which is usually earthed but may be at a potential of either polarity.

U.S. Pat. No. Re. 27771 discloses such a process of electrostatic-pinning and in particular is concerned with a process in which a direct current supply is used to develop the electrostatic charges. The specification states that a positive or negative current, but not both, may be used and that it is possible to use a pulsating supply superimposed upon a direct current supply if the polarity of the resultant current does not undergo any change, i.e. remains either positive or negative.

A process of electrostatic-pinning has now been developed in which the polarity of the resultant pinning current used to generate the electrostatic charge does in fact change sign.

According to the present invention a process for quenching a molten polymeric film comprises forming a molten polymeric film and quenching said film on a cooled casting surface which is electrically earthed, the molten film being passed across an electrode located in spaced relation from the film surface and in the proximity of the region of first contact of the molten film and the casting surface, applying an alternating voltage to the electrode, said voltage being of symmetrical or asymmetrical waveform and exceeding 4.0 kilovolts peak to peak and having a frequency not exceeding that at which positive and negative electrostatic charges emitted by the electrode are unable to cross the space between the electrode and the molten film before the polarity of the voltage on the electrode changes, whereby the electrostatic charges emitted by the electrode are deposited by the applied electric field upon the molten film to cause it to adhere to the casting surface.

The invention also relates to an apparatus for quenching molten polymeric film which comprises a cooled and electrically earthed casting surface for quenching the molten film, an electrode located in spaced relation from the path of the film surface and in the proximity of the region of first contact of the molten film and the casting surface, the electrode being connected to a source of alternating voltage having a symmetrical or asymmetrical waveform, said source providing an output which exceeds 4.0 kilovolts peak to peak and has a frequency not exceeding that at which positive and negative electrostatic charges emitted by the electrode are unable to cross the space between the electrode and the molten film before the polarity of the voltage on the electrode changes, whereby, in operation electrostatic charges are emitted by the electrode and deposited by the applied electric field upon the molten film to cause the film to adhere to the casting surface.

Hereinafter this description uses the term "AC" to refer to the alternating electrical supply.

The present invention may be used for the quenching of all polymeric materials which are capable of being formed into a flat film by extrusion and being quenched, such as polycarbonates, polyamides, e.g. polyhexamethylene adipamide and polycaprolactam, polysulphones, polymers and copolymers of alpha olefines, e.g. ethylene, propylene, butene and 4-methyl pentene-1, polymers and copolymers of vinyl monomers, e.g. vinyl chloride, linear polyesters and copolyesters, e.g. those which may be produced by condensing one or more dicarboxylic acids or their lower alkyl diesters of terephthalic acid, isophthalic, phthalic, 2,5-, 2,6- or 2,7-naphthalene dicarboxylic acid, succinic acid, sebacic acid, adipic acid, azelaic acid, diphenyl dicarboxylic acid, or hexahydroterephthalic acid or bis-p-carboxylphenoxy ethane, optionally with a mono-carboxylic acid, such as pivalic acid, with one or more glycols chosen from ethylene glycol, 1,3-propanediol, 1,4-butanediol, neopentyl glycol and 1,4-cyclohexanedimethanol. The present invention is particularly suitable for the production of polyethylene terephthalate film.

In the arrangement of the present invention in which an AC supply is applied to the electrode, the electrostatic charges which cause adhesion to the casting surface are produced by a corona discharge current in the electrode circuit which is nominally in-phase with the AC voltage supply. The corona discharge, and hence the discharge current, is only established when the applied voltage exceeds the corona discharge inception voltage of the electrode assembly. The actual inception voltage of an assembly is determined by the characteristics of the electrode and its position in space in relation to the molten film. For instance, corona discharge occurs at a lower voltage from a fine electrode than from a blunt electrode. Thus the inception voltage is lower for a point electrode having a smaller radius head than for a larger radius electrode, and likewise for a smaller radius wire electrode than one of larger radius. For most electrodes the inception voltage will be at least 6.0 kilovolts peak to peak and the peak to peak voltage applied to the electrode should generally exceed the actual inception voltage by at least about 1 kilovolt. Inception voltages may be as high as about 20.0 kilovolts peak to peak. For example, a wire electrode of diameter 0.005 to 0.007 inch has an inception voltage of about 6.0 to 11.0 kilovolts peak to peak depending on its position relative to the molten film. Operating the electrode above its inception voltage at a potential of about 6.0 to 12.0 kilovolts, preferably 8.0 to 12.0 kilovolts peak to peak normally produces a satisfactory pinning effect. For a given electrode assembly, the negative discharge inception voltage is arithmetically less than the position discharge inception voltage, the actual voltages required in operation depending on the geometry of the electrode assembly. In addition, the negative corona discharge is generally characterized by intense spot discharges distributed along the length of the electrode. If the negative peak voltage is too large the localised negative corona becomes too intense and may result in pitting and crater defects in the molten film. The positive discharge does not exhibit similar characteristics. Accordingly, it is preferred that the applied voltage should be asymmetrical and that the positive peak voltage should exceed the negative peak voltage. Furthermore, since film surface defects are generally not acceptable for many end uses, it is preferred to use a negative peak voltage below that at which defects would occur. It has also been found that the use of an appropriately chosen asymmetric applied voltage provides more closely matched discharge currents and hence more closely matched pinning forces in the negative and positive voltage excursions.

In order that the discharge should occur during both the positive and negative parts of the applied voltage cycle the peak to peak voltage must equal and preferably exceed the AC corona discharge inception voltage of the electrode assembly. Thus for most typical electrodes the peak positive and negative voltage should exceed 2.0 kilovolts relative to the mean potential of the polymeric film.

When operating with an applied asymmetric voltage in which the positive peak voltage is greater than the negative peak voltage it is preferred that the positive offset voltage relative to a balanced symmetric state should be in the range 1 to 4 kilovolts, and preferably from 1.5 to 3 kilovolts.

Residual charges remaining on the film after it has been subjected to any process operations that may follow the quenching step can lead to a number of difficulties, such as poor handling characteristics because of blocking between adjacent layers of a roll of film and problems arising through the discharge of the charges, e.g. leading to a fire hazard in film coating processes in which the coating is applied from an organic medium. It has been found that a residual negative charge upon the film can be difficult to dissipate so that the electrical supply is preferably asymmetrical to ensure that the final film is substantially neutral or alternatively is slightly nett positively charged, in the latter case because positive charges are easier to dissipate than negative charges.

The resultan rms (root mean square) in-phase pinning current applied to the electrode is conveniently within the range 0.2 to 20 milliamperes depending upon the size and speed of the casting equipment. The rms current represents the current consumption for pinning and leakage effects.

According to this invention the frequency of the voltage applied to the electrode should not exceed a value at which the positive and negative electrostatic charges emitted by the electrode are unable to cross the space between the electrode and the molten film before the polarity of the voltage on the electrode changes. If the frequency is allowed to exceed such a value, pinning would be impaired because the discharge does not reach the cast film and recombination of the ionised air between the electrode and the film may take place. Increasing the speed at which the molten film is fed to and removed from the casting surface serves to raise the lower frequency limit at which casting may be effected without impairing the cast quality. The frequencies employed generally need not exceed 50 kHz and may be within the range 500 Hz to 10 Khz, and are most preferably from 1 to 3 kHz but frequecies employed with a "trapezoidal" or substantially "square" waveform as descried below may be below 500 Hz.

The AC voltage applied to the electrode may have any suitable waveform, such as a sine, "trapezoidal" or substantially "square" wave, and may be derived from any suitable supply such as an electronic source, which may, when appropriate, operate under resonant or nonresonant conditions. For example, a "trapezoidal" or substantially "square" waveform may be generated by means of a transformer having windings suitably designed to handle the desired waveform.

Suitable "trapezoidal" or substantially "square" waves may be generated by means of a pulse generator, a power amplifier and a transformer. Low voltage pulse generators are commercially available in which the rise and fall times of the pulse can be varied between $30 \times 10^{-9}$ second to 3 seconds with repetition rates of 0.3 Hz to 10 MHz.

When a sine wave alternating, or "AC", electrical supply is employed, electrostatic charges are only emitted by the pinning electrode when the instantaneous voltage on the electrode exceeds the corona discharge inception voltage of the electrode assembly. In a typical assembly operating with a sine wave voltage supply, this condition may exist for as little as 50% of the total voltage cycle time with the result that no pinning charges are produced for a sustantial proportion of the cycle. Although the disadvantages of this effect can be reduced by increasing the AC peak to peak voltage, other disadvantages, such as an increased risk of sparking between the pinning electrode and the casing surface or the extrusion die, a less stable corona, and the general need for better electrical insulation, may be introduced.

These difficulties may be avoided according to one embodiment of this invention by the use of a "trapezoidal" or substantially "square" wave voltage supply wherein the voltage applied to the electrode is maintained above the corona discharge inception voltage of the electrode assembly for at least 75% of the duration of each voltage half cycle, and a lapse time of at least 10 microseconds is maintained in each half cycle during which no discharge current is produced.

During the lapse time when there is no discharge current, the applied voltage is less than the corona discharge inception voltage and electrostatic charges are not emitted by the electrode. Preferably the lapse time is at least 20 microseconds in each half cycle. The lapse time may occur during voltage rise, voltage decay or a combination of both. It is essential that a lapse time be employed in each half cycle to ensure that electrostatic charges which may be established in the gap between the electrode and the molten film during one half cycle are dispersed before charges of opposite polarity are established in the gap between the electrode and the molten film as a result of the applied voltage changing polarity thereby preventing the formation of a conducting plasma in the gap. Consequently, consecutive corona current pulses of alternate polarity are separated by a period of no discharge current.

Preferably, when using such a "trapezoidal" or substantially "square" wave supply, the corona discharge inception voltage, and indeed the optimum peak operating voltage, is reached as rapidly as possible after the desired lapse time has elapsed. Ideally, the optimum peak operating voltage is then maintained substantially constant throughout the rest of the half cycle. In any case the operating voltage is maintained above the corona discharge inception voltage for at least 75% of the voltage half cycle. Preferably, the operating voltage is maintained for 90 to 95% of the voltage half cycle.

The molten film may be obtained in a known manner by extrusion through a slot die which is located a short distance away from the casting surface. As the molten film generally tends to neck-in between the die and the casting surface it is desirable to locate the die as close as possible to the casting surface so as to minimise the extent of neck-in.

It is important to ensure that electrical arcing or excessive current loss does not occur between the die and the electrode, which is located close to the molten film, and therefore the actual spacing of the die from the casting surface may be determined in practice by the precautions which must be adopted to avoid arcing or current loss.

The casting surface may be, in a continuous process, a moving belt or preferably a rotating roll or drum. It is desirable for the casting surface to have a smooth highly poslished finish to avoid imparting surface blemishes to the film surface. Conveniently the casting surface is a highly polished metal, e.g. steel, roll or drum, which may be cooled to the desired quenching temperature by the passage of a cooling medium, such as water.

The electrostatic charges deposited by the electrode upon the molten film serve to adhere or pin the film to the casting surface, which is electrically earthed, and the electrode may therefore be referred to as a "pinning electrode".

The pinning electrode is generally located close to the surface of the molten film, e.g. about 0.07 to 1.00 inch above the molten film surface, to supply electrostatic charges to the film so that the film is pinned to the casting surface by electrostatic attraction.

The pinning electrode may be disposed transversely across the path of the molten film and preferably supplies electrostatic charges to the side of the molten film which is remote from the casting surface when the film is applied to the surface.

The pinning electrode should have a fine surface capable of discharging electrostatic charges and may consist of a knife edge, a wire or a set of probes or needles. Most conveniently the electrode consists of a wire made from a metal which should preferably be resistant to attack and contamination by any vapours or materials which may be emitted by the molten film. Suitable metals include stainless steel, tungsten, nickel alloys, e.g. nickel-iron alloys, and nickel-chrome alloys. A fine wire having a diameter up to 0.08 inch, conveniently 0.005 up to 0.01 inch may be used.

It often happens that the edges of the film do not extend to the edges of the casting surface and there is therefore a risk that arcing may occur between the pinning electrode and the exposed margins of the casting surface. As a precaution against arching, the parts of the pinning electrode located above the margins of the casting surface may be electrically insulated with a suitable dielectric material. For instance, when the pinning electrode is in the form of a wire, tubular sleeve insulators made of, e.g. polytetrafluoroethylene which is commercially available under the trade name 'Fluon', may be positioned over the appropriate parts of the wire.

After prolonged running, volatile materials which may emerge from the molten polymeric material and condense upon the pinning electrode surface tend to impair the efficiency of the pinning and hence the quenching effect. In order to avoid this problem a pinning wire electrode may be drawn from a supply of fresh wire and transported slowly across the path of the film. Alternatively a continuous pinning wire may be wound across the film and passed through a cleaning bath or scraper to remove any deposited material. As a further alternative, deposition may be avoided by directing a blast of gas or air between the pinning electrode and the molten film so as to disperse the vapours or by heating the pinning electrode to a temperature above the condensation temperatue of the vapours.

In order that the invention may be more readily understood it is described further with reference to the accompanying drawings, wherein:

FIG. 1 is a perspective view of apparatus which may be used according to this invention; and FIGS. 2 to 5 illustrate various "trapezoidal" or substantially "square" wave voltage supplies which may be used according to this invention.

FIG. 1 of the drawings illustrates the casting of a molten film 1 on to a rotating polished steel casting drum surface 2 which is cooled by the passage of a quenching fluid through the inlet 3 and outlet 4 which are coincident with the axis about which the drum rotates. The quenched film 6 is removed from the drum surface 2 over a roll (obscured in the drawing by the drum) and is passed to a conventional molecular orienting and heat setting unit (not illustrated).

A pinning wire electrode 8 is supported in tension close to the film surface in the proximity of the touch down region of the molten film on the casting drum surface 2. The wire electrode 8 is made from a nickel-chromium stainless steel (8%/18%) and has a diameter of approximately 0.007 inch.

The molten film web 1 is narrower than the casting drum surface 2 so that bare margins 9 and 10 of the metal casting drum surface are exposed beneath the pinning wire beyond the edges of the web 1. Accordingly the end sections of the pinning wire 8 which are located above these exposed margins 9 and 10 are insulated with polytetrafluoroethylene tubular insulators 12 and 13 which just overlap the edges of the film web 1.

The pinning wire electrode 8 is connected to a source 15 of asymmetrical AC electrical source. The source 15 provides an electrical supply having a sine wave output voltage of up to a 7.5 kv rms at a frequency of 2.5 kHz with a maximum power consumption of 300 VA to allow for the in-phase pinning current and the capacity current required by the system.

In operation electrostatic charges are deposited from the wire electrode 8 upon the molten film 1 and attract the film to the surface of the casting drum 2 which is maintained at earth potential.

Figure 2:
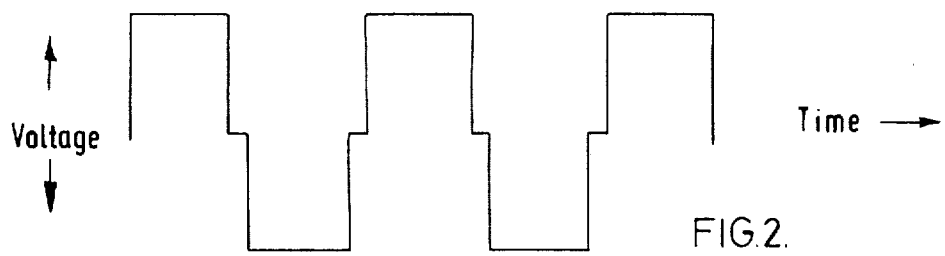
Figure 3:
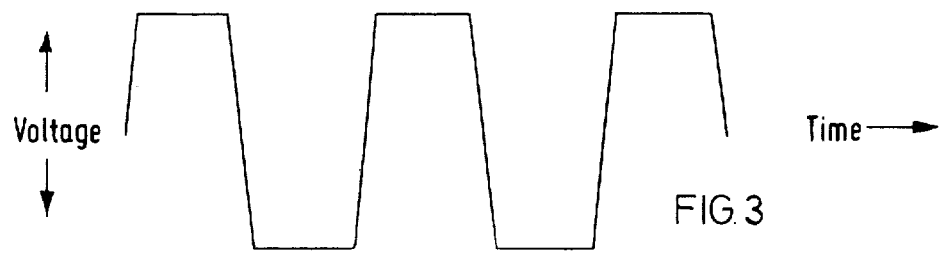
Figure 4:
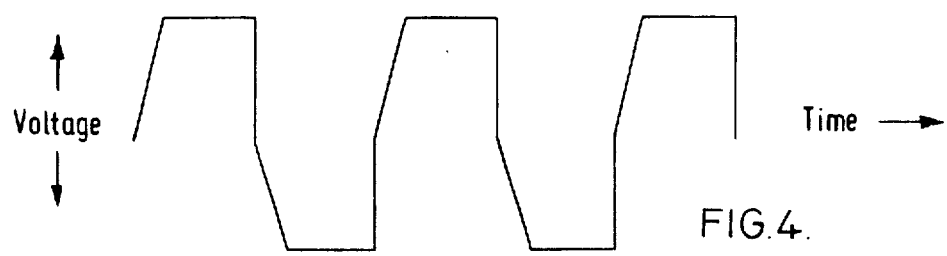
Figure 5:
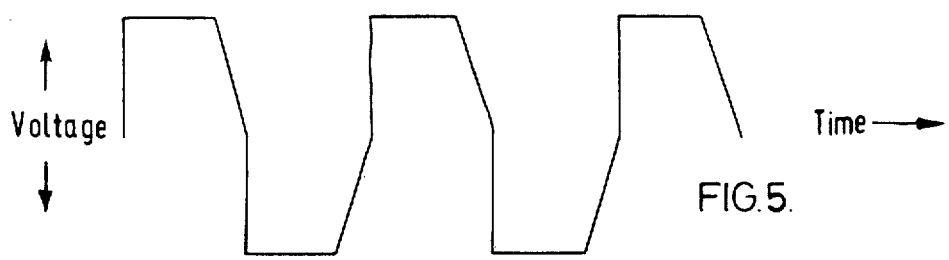

Alternative "square" or substantially "trapezoidal" voltage waveforms which may be used according to this invention are illustrated in FIGS. 2 to 5 of the accompanying drawings. FIG. 2 illustrates a "square" waveform in which the established voltage is reduced instantaneously to zero and is not established in the next half cycle until a lapse time of at least 10 microseconds has elapsed. In FIG. 3, the voltage of a substantially "trapezoidal" waveform varies progressively between the positve and negative operating values and is maintained during its transition for at least 10 microseconds below the corona inception voltage. FIG. 4 illustrates a substantially "trapezoidal" waveform which increases in magnitude during each half cycle to a maximum operating value and during its increase is maintained below the corona inception voltage for at least 10 microseconds. FIG. 5 illustrates a substantially "trapezoidal" waveform which rises instantaneously during each half cycle to its maximum operating value and then decays to zero, falling below the corona inception voltage for at least 10 microseconds.

Various modifications of the waveforms illustrated in FIGS. 2 to 5 of the drawings may be employed. For example, the flat top of the wave may vary with a rise and/or decay in magnitude above the corona discharge inception voltage.

Using the process and apparatus of this invention, firm adhesion or pinning to the casting surface is achieved. This leads to good thermal contact between the casting surface and the molten polymeric film so that a satisfactory quenching effect is attainable.

Film pinned and quenched by this invention may be subjected to subsequent film making and treating processes in a conventional manner. For example, the film may be molecularly oriented by stretching in one or more directions including processes employed for tensilising the film by developing a higher tensile strength in one direction than in a mutually perpendicular direction, heat set, thermally relaxed, and surface treated or coated, the latter being effected, when the film is molecularly oriented, before, after or between the stretching operations used to impose molecular orientation.

The invention is further illustrated by the following examples.

EXAMPLE 1

Using the apparatus described above with reference to FIG. 1 of the drawings, a molten film of polyethylene terephthalate was cast on to a rotating casting drum which was cooled by the passage of cold water to quench the cast film below its second order glass transition temperature.

The cast film was electrostatically pinned to the casting drum by means of a sine wave AC voltage supply applied to the pinning wire electrode which was located approximately 5 mm from the drum surface.

The casting and pinning conditions were:

| | |
|---|---|
| Peripheral speed of casting drum | 12.2 m/minute |
| Asymmetrical voltage applied to wire electrode | 7.3 kv positive peak<br>2.7 kv negative peak |
| Resulting rms pinning current including leakage currents | 2.25 mA positive peak<br>1.33 mA negative peak |
| Frequency of pinning voltage | 2.5 kHz |

The resulting quenched film was of thickness 245 μm and width 0.546 m and was adequately quenched to the amorphous state. It had good surface quality and was free from transverse bar defects.

The quenched film was subjected to a conventional process to biaxially orient the film by stretching approximately 3.5 times in mutually perpendicular directions followed by heat setting. The resulting biaxially oriented and heat set film was also of good surface quality.

EXAMPLES 2 TO 10

The procedure of Example 1 was repeated to cast a film of polyethylene terephthalate using electrostatic pinning developed from a sine wave AC voltage supply applied to the wire electrode. The casting and pinning conditions are specified in the table below.

The pinning electrode used in Examples 2 to 8 was the same as that used in Example 1, i.e. a nickel-chromium stainless steel (8%/18%) wire of approximate diameter 0.007 inch. The pinning electrode used in Examples 9 and 10 was a tungsten wire of approximate diameter 0.007 inch.

| Example | Peripheral speed of casting drum m/minute | Spacing between wire electrode and casting drum surface mm | Asymmetrical voltage applied to electrode kv | | Peak current including leakages mA | | Frequency kHz | Quenched film thickness μm | Quenched film width m |
|---|---|---|---|---|---|---|---|---|---|
| | | | positive peak | negative peak | positive peak | negative peak | | | |
| 2 | 27.4 | 5.0 | 7.0 | 3.0 | 1.50 | 1.27 | 2.5 | 150 | 0.27 |
| 3 | 8.5 | 7.0 | 5.5 | 5.5 | 1.26 | 1.47 | 2.5 | 150 | 0.25 |
| 4 | 16.7 | 7.0 | 6.0 | 6.0 | 2.74 | 3.32 | 1.0 | 75 | 0.245 |
| 5 | 16.5 | 7.0 | 5.5 | 4.5 | 2.45 | 2.74 | 1.0 | 75 | 0.245 |
| 6 | 7.4 | 7.0 | 8.5 | 2.1 | 0.84 | 0.53 | 2.5 | 400 | 0.37 |
| 7 | 17.4 | 4.5 | 7.0 | 1.0 | 2.88 | 0.87 | 2.5 | 275 | 0.675 |
| 8 | 28.7 | 4.5 | 7.0 | 1.0 | 2.88 | 0.43 | 2.5 | 200 | 0.67 |
| 9 | 6.1 | 5.5 | 6.5 | 2.5 | — | — | 2.5 | 1900 | 0.75 |
| 10 | 17.7 | 4.0 | 6.3 | 2.3 | — | — | — | 475 | 0.78 |

The peak current was not measured in Examples 9 and 10 but positive and negative corona were observed on the wire electrode under darkened conditions, indicating that electrostatic charges were generated for pinning currents of either polarity.

The resulting quenched film obtained in each of these examples was quenched satisfactorily to the amorphous state and was of good surface quality and free from transverse bar defects.

Each of the quenched films was subjected to a conventional process of molecular orientation by biaxially stretching the film about 3.5 times it original dimensions in mutually perpendicular directions and heat setting. The biaxially oriented and heat set films also exhibited good surface quality.

EXAMPLE 11

A molten film of polyethylene terphthalate was cast on to a casting drum rotating at a periphral speed of 21.3 m/minute. An electrostatic pinning electrode made from a nickel-chromium stainless steel wire of diameter 0.007 inch was located approximately 5 mm from the casting drum surface in the proximity of the region of first contact of the molten film with the casting surface.

Casting was effected using a pinning supply having a wave shape similar to that shown in FIG. 3 of the drawings except that the flat top of each half wave had a slight decay. The supply was as follows:

| | | |
|---|---|---|
| Asymmetrical voltage: | 7.1 kv positive peak | maximum at flattened top |
| | 2.1 kv negative peak | |
| | 6.75 kv positive peak | minimum at |

|                                                                              |                                    |              |
| ---------------------------------------------------------------------------- | ---------------------------------- | ------------ |
|                                                                              | 1.75 kv negative peak              | flattened top |
| Frequency:                                                                   | 1200 Hz                            |              |
| Time of voltage rise negative to positive and positive to negative peaks     | approximately 80 μ seconds         |              |

The molten film adhered to the casting drum by means of the applied electrostatic charges and was quenched to width and thickness similar to that obtained when using sine wave pinning. The quenched film was of good quality and was devoid of surface defects caused by bubbling.

EXAMPLE 12

The procedure of Example 1 was repeated to cast a film of polyethylene terephthalate using electrostatic pinning developed from a sine wave AC voltage supply applied to the wire electrode. The casting and pinning conditions were:

| Peripheral speed of casting drum | 3.2 m/minute |
| --- | --- |
| Spacing between pinning wire and casting surface | approximately 5 mm |
| Asymmetrical voltage applied to wire electrode | 8.1 kv positive peak<br>5.4 kv negative peak |
| Resulting rms pinning current including leakage currents | 3.24 mA positive peak<br>3.95 mA negative peak |
| Frequency of pinning voltage | 2.5 kHz |

The resulting quenched film was of thickness 1000 μm and width 0.28 m. It was uniformly quenched and of good quality without transverse bar defects. The quenched film was biaxially oriented by stretching about 3.5 times in mutually perpendicular directions and heat set to produce good quality film.

The nett charge deposition on the molten film was assessed from a cathode ray tube display of the current in the pinning circuit by arithmetically summing the area under positive and negative corona pinning curent pulses separated from the total current. The resulting nett charge deposition was -230 microcoulombs per square meter, indicating a substantial balance of charges of both polarities but not substantially zero charge deposition.

We claim:

1. A process for quenching a molten polymeric film, which comprises forming a molten polymeric film and quenching said film on a cooled casting surface which is electrically earthed, the molten film being passed across an electrode located in spaced relation from the film surface and in the proximity of the region of first contact of the molten film and the casting surface, applying an alternating voltage to the electrode, said voltage being an asymmetrical wave form, having positive and negative portions with the positive peak having a greater magnitude than the negative peak, and exceeding 4.0 kilovolts peak to peak, the peak to peak voltage being at least equal to the A.C. corona discharge inception voltage and having a frequency less than that at which positive and negative electrostatic charges alternately emitted by the electrode are unable to cross the space between the electrode and the molten film before the polarity of the voltage on the electrode changes, so as to produce an rms pinning current to the electrode, including leakage current, in the range 0.2 to 20 milliamperes whereby the electrostatic charges emitted by the electrode are deposited by the applied electric field upon the molten film to cause it to adhere to the casting surface.

2. A process according to claim 1, in which the voltage applied to the electrode exceeds the inception voltage of the electrode by at least 1 kilovolt.

3. A process according to claim 1, in which the applied voltage exceeds the inception voltage of the electrode and is in the range 8.0 to 12.0 kilovolts peak to peak.

4. A process according to claim 1, in which the frequency of the applied voltage is at least 500 Hz.

5. A process according to claim 4, in which the frequency of the applied voltage is in the range 1 to 3 kHz.

6. A process according to claim 1, in which the resultant rms pinning current applied to the electrode, which includes leakage currents, is in the range 0.2 to 20 milliamperes.

7. A process according to claim 1, in which the electrostatic charges are emitted by a wire electrode of diameter from 0.005 to 0.01 inch.

8. A proces according to claim 1, in which the alternating voltage applied to the electrode is of sine waveform.

9. A process according to claim 1, in which the polymeric film quenched is polyethylene terephthalate film.

10. A process according to claim 1, in which the voltage applied to the electrode is maintained above the corona discharge inception voltage of the electrode assembly for at least 75% of the duration of each voltage half cycle, and a lapse time of at least 10 microseconds is maintained in each half cycle during which no discharge current is produced.

11. A process according to claim 10, in which the operating voltage is maintained for 90 to 95% of the voltage half cycle.

* * * * *